(12) United States Patent
Davis et al.

(10) Patent No.: US 7,985,284 B2
(45) Date of Patent: Jul. 26, 2011

(54) INLET AIR CONDITIONING SYSTEM FOR A TURBOMACHINE

(75) Inventors: Dale J. Davis, Marietta, GA (US); Rahul J. Chillar, Marietta, GA (US); Eric Gebhardt, Roswell, GA (US)

(73) Assignee: General Electric Company, Schenectady, NY (US)

( * ) Notice: Subject to any disclaimer, the term of this patent is extended or adjusted under 35 U.S.C. 154(b) by 459 days.

(21) Appl. No.: 12/189,909

(22) Filed: Aug. 12, 2008

(65) Prior Publication Data

US 2010/0037777 A1    Feb. 18, 2010

(51) Int. Cl.
    *B01D 47/00*      (2006.01)

(52) U.S. Cl. ............ 96/228; 96/413; 96/244; 415/118; 95/1; 134/198; 134/167 R; 134/166 R; 324/71.2; 324/700

(58) Field of Classification Search .......... 96/228, 96/413; 95/9; 415/118
See application file for complete search history.

(56) References Cited

U.S. PATENT DOCUMENTS

| | | | |
|---|---|---|---|
| 4,215,412 A * | 7/1980 | Bernier et al. | 701/100 |
| 4,808,235 A * | 2/1989 | Woodson et al. | 134/22.19 |
| 5,076,855 A * | 12/1991 | Kaes | 134/2 |
| 5,279,760 A * | 1/1994 | Sato et al. | 510/185 |
| 5,868,860 A * | 2/1999 | Asplund | 134/22.1 |
| 6,073,637 A * | 6/2000 | Hayward et al. | 134/22.1 |
| 6,628,111 B2 * | 9/2003 | Shapiro et al. | 324/71.2 |
| 7,020,595 B1 * | 3/2006 | Adibhatla et al. | 703/7 |
| 7,185,663 B2 * | 3/2007 | Koch et al. | 134/22.19 |
| 7,571,735 B2 * | 8/2009 | Wagner | 134/198 |
| 7,703,272 B2 * | 4/2010 | Wagner et al. | 60/39.53 |
| 7,861,511 B2 * | 1/2011 | Chillar et al. | 60/39.52 |
| 2008/0201104 A1 * | 8/2008 | Poncet et al. | 702/181 |

FOREIGN PATENT DOCUMENTS

JP     10-169413     * 6/1998

* cited by examiner

*Primary Examiner* — Duane Smith
*Assistant Examiner* — Ives Wu
(74) *Attorney, Agent, or Firm* — Dale J. Davis; Ernest G. Cusick; Frank A. Landgraff

(57) ABSTRACT

An embodiment of the present invention measures a sample of the airstream, in real time, for a corrosive, before the airstream enters the compressor. An embodiment of the present invention may then initiate an on-line water wash system to reduce the level of the at least one corrosive on the compressor. An embodiment of the present invention also provides an on-line water wash system that may mix a cleaning fluid with at least one chemical agent to form a cleaning solution. The cleaning solution reduces the level of corrosives on components of a turbomachine compressor. The cleaning solution may be an acidic solution to reduce corrosion of a caustic nature. Alternatively, the cleaning solution may be a basic solution to reduce corrosion of an acidic nature.

29 Claims, 4 Drawing Sheets

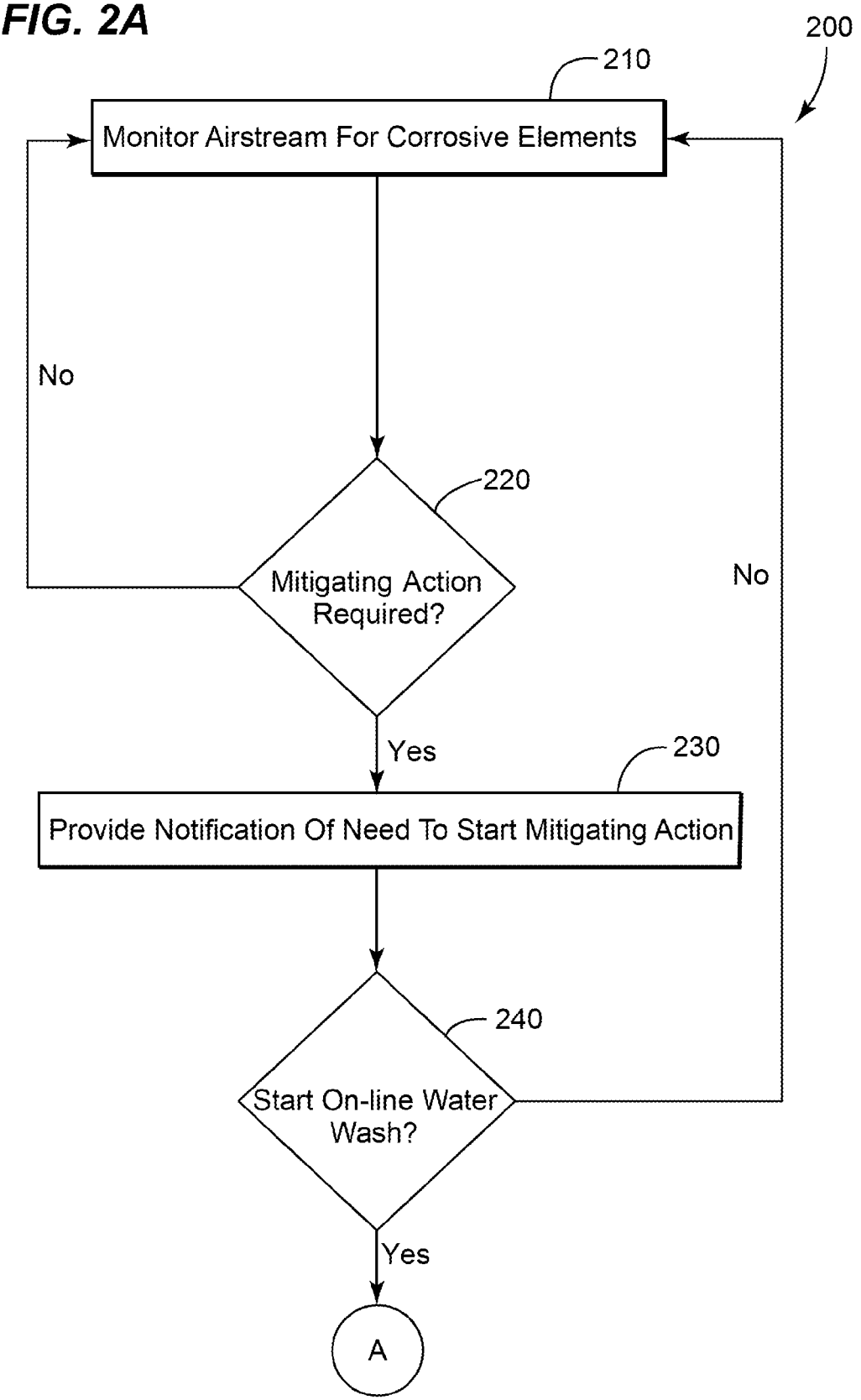

INLET AIR CONDITIONING SYSTEM FOR A TURBOMACHINE

BACKGROUND OF THE INVENTION

The present invention relates generally to a turbomachine; and more particularly to a method for cleaning the compressor of a turbomachine.

Some turbomachines, including, gas turbines, and aero-derivatives, have an air inlet system that channels the incoming airstream towards a compressor. The inlet system usually has a filter section, which screens the airstream of foreign objects and other undesired materials. Typically, the inlet system and the compressor are created out of materials that may corrode due to the environment (ambient conditions, etc.) in which the turbomachine operates. The turbomachines may develop microenvironments related to the ambient conditions in which the turbomachine operates. These microenvironments, which have accelerated airflows and pressures, can increase the corrosion rate of the compressor.

The fouling of the compressor due to the corrosion can significantly impact the performance and heat-rate of the turbomachine. Therefore, the sooner the turbomachine operator learns of compressor fouling, the sooner mitigation efforts can start. A commonly used mitigation effort uses a water wash system.

Water wash systems are commonly used to remove contaminants and reduce corrosives on the compressor. Some water wash systems operate while the turbomachine operates. These are commonly referred to as "on-line" water wash systems. On-line water wash systems typically use de-mineralized water (hereinafter "de-min water") to clean the compressor. However, a cleaner stronger than de-min water is required to reduce or eliminate some corrosives. Determining when to operate an on-line water wash system may aid in reducing the level of corrosion developing the compressor.

Some known systems require an offsite analysis to determine the level and types of corrosives entering a compressor. These systems delay the start of mitigation efforts. These systems may not be directly linked with the mitigating actions.

An embodiment of the present invention takes the form of an application and process that has the technical effect of determining when a mitigating action should be implemented to reduce the level of corrosives on a compressor 155. The present invention can be applied to many types of compressors 155 which ingest air. This may include, but is not limiting of, compressors 155 coupled to various forms of turbomachines, such as a gas turbine, an aero-derivative, or the like.

For the foregoing reasons, there is a need for a method that analyzes, in real-time, the level of at least one corrosive within an airstream entering the compressor. The method should determine whether a mitigating action should be implemented. The method should link the analysis of the corrosives in the airstream with operation of the on-line water wash system.

BRIEF DESCRIPTION OF THE INVENTION

In an embodiment of the present invention, a method of reducing a level of corrosion on a compressor, the method comprising: providing a corrosion detection system adapted to perform the steps of: separating at least one corrosive from a sample of an airstream entering the compressor; and determining a level of the at least one corrosive; determining whether a mitigating action is desired to reduce the level of the at least one corrosive; and reducing the level of the at least one corrosive, if the mitigating action is desired.

In an alternate embodiment of the present invention, a system for reducing a level of corrosion on a compressor, the system comprising: a turbomachine comprising: an inlet system; a compressor; a turbine section; an on-line water wash system; a corrosion detection system comprising: at least one air processing unit configured to separate at least one corrosive from a sample of an airstream entering the compressor; and at least one analyzer configured to determine a level of the at least one corrosive; and a control system comprising at least one processor, wherein the control system performs the steps of: utilizing the corrosion detection system to monitor the airstream for at least one corrosive; determine whether a mitigating action is desired to reduce the level of the at least one corrosive; determining whether to perform a water wash; and control the on-line water wash system if the water wash is desired.

BRIEF DESCRIPTION OF THE DRAWINGS

These and other features, aspects, and advantages of the present invention will become better understood when the following detailed description is read with reference to the accompanying drawings in which like characters represent like elements throughout the drawings.

FIGS. 2A and 2B, collectively FIG. 2, are flowcharts illustrating a method of initiating an on-line water wash system to reduce the level of corrosives in an airstream.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

The present invention has the technical effect of measuring a sample of the airstream, in real time, for at least one corrosive, before the airstream enters the compressor. The present invention also has the technical effect of initiating an on-line water wash system to reduce the level of the at least one corrosive on the compressor. An embodiment of the present invention provides an on-line water wash system that may mix a cleaning fluid with at least one chemical agent to form a cleaning solution. The cleaning solution reduces the corrosives on components of a turbomachine compressor. The cleaning solution may be an acidic solution to reduce corrosion of a caustic nature. Alternatively, the cleaning solution may be a basic solution to reduce corrosion of an acidic nature.

Figure 1:
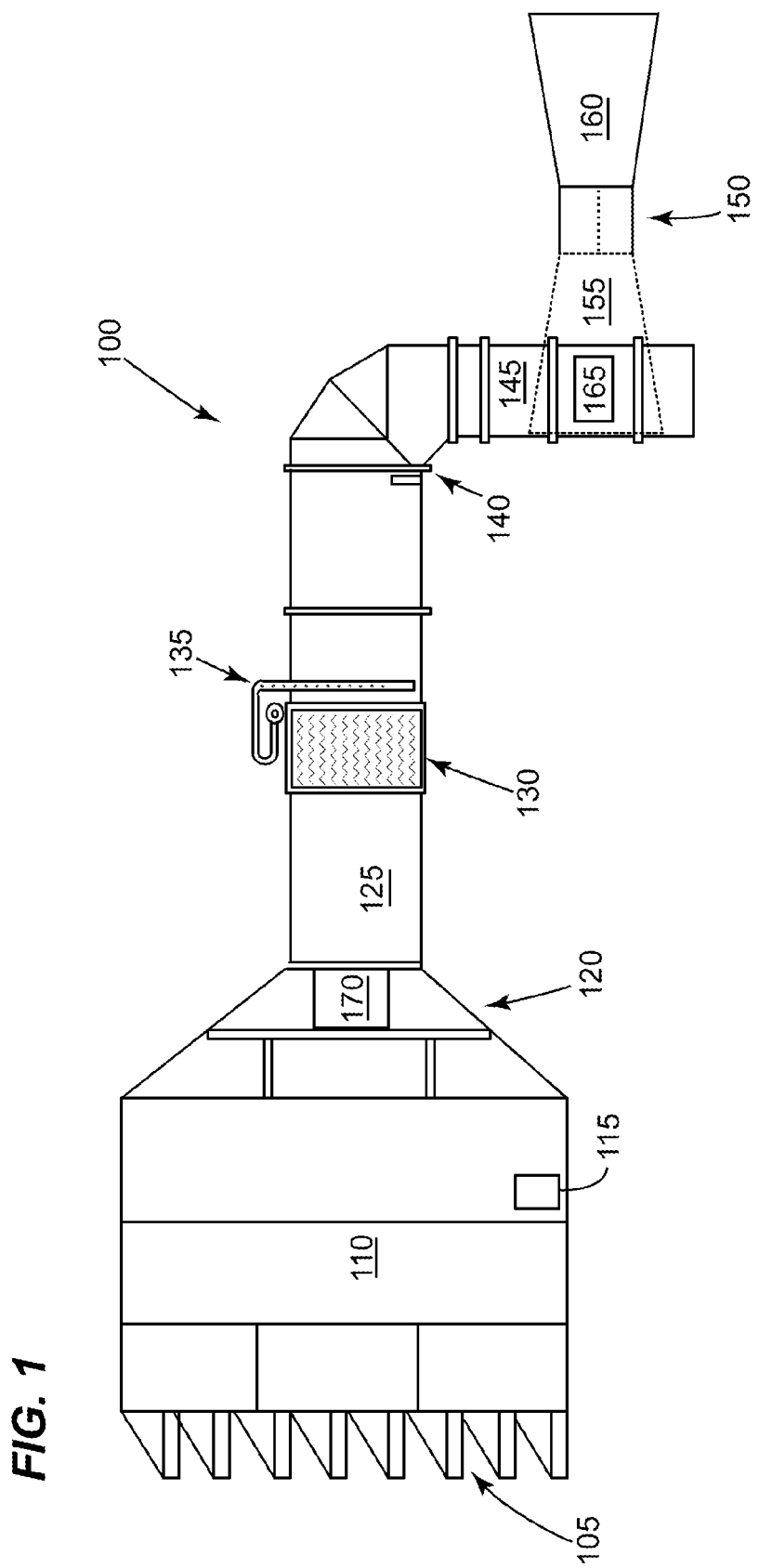
FIG. 1 is a schematic illustrating an environment where an embodiment of the present invention may operate.

Referring now to the Figures, where the various numbers represent like elements throughout the several views, FIG. 1 is a schematic illustrating an environment where an embodiment of the present invention may operate. FIG. 1 illustrates an inlet system 100 that may be integrated with a compressor 155 of a turbomachine 200. During operation of the turbomachine 150, a corrosion detection system 170, may determine whether the compressor 155 has become fouled by corrosives elements within the airstream. Also, an embodiment of the present invention may notify the operator of the turbomachine 150 to use an on-line water wash system 165 to clean and reduce the level of corrosion on the compressor 155.

The following description provides an overview of a typical configuration of an inlet system 100; the present invention may be used with other configurations of the inlet system 100, which are not illustrated in the Figures. The inlet system 100 channels the airstream ingested by the compressor 155. The airstream usually comes from the environment in which the turbomachine 150 operates. Initially, the airstream flows around a weather hood 105, which may prevent weather elements, such as rain, snow, etc, from entering the compressor 155. The airstream may then flow through an inlet filter house 110; which generally removes foreign objects and debris from the airstream. Next, the airstream may flow through a cooling module 115. Next, the airstream may flow through a transition piece 120 and an inlet duct 125; these components may adjust the velocity and pressure of the airstream. Next, the airstream may flow through a silencer section 130. Next, the airstream may flow through an inlet bleed heat system 135, which generally increases the airstream temperature prior to entering the compressor 155. A screen 140, or the like, may be located downstream of the inlet duct 125 and generally serves to prevent debris from entering the compressor 155. The inlet plenum 145 may connect the inlet system 100 with the compressor 155.

In an embodiment of the present invention the on-line water wash system 165 includes a plurality of nozzles (not illustrated in the Figures) located in and/or adjacent the inlet plenum 145. The on-line water wash system 165 may be integrated with the turbomachine 150. In an embodiment of the present invention, the turbomachine 150 comprises: a compressor 155 and a turbine section 160. Generally, on-line water washing may be considered the process of injecting a cleaning fluid such as, but not limiting of, de-min water, into the inlet of the compressor 155 while the turbomachine 150 operates near a synchronous speed. On-line water washing provides the user with the advantage of cleaning the compressor 155 without shutting down the turbomachine 150.

An embodiment of the on-line water wash system 165 may use at least one chemical agent to neutralize the corrosives on the compressor 155. Here, the chemical agent may be mixed with the cleaning fluid, creating a cleaning solution. The chemical agent or agents may be of a mild strength, making the cleaning solution either mildly acidic or mildly basic. This cleaning solution may neutralize the corrosives and possibly remove some of the corrosive deposits on the compressor 155.

Generally, the water wash system 165, in accordance with embodiments of the present invention, may operate as follows. An operator may initiate the on-line water wash system 165. Then a rinse cycle commences; which may only use at least one cleaning fluid. Next, a wash cycle commences; which may include at least one cleaning solution comprising the at least one cleaning fluid and at least one cleaning agent. Next, additional rinses may commence to rinse away some of the corrosives and the cleaning solution from the compressor 155.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like, including different versions of the aforementioned languages. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN), a wide area network (WAN), a wireless network, and combinations thereof; or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following detailed description of preferred embodiments refers to the accompanying drawings, which illustrate specific embodiments of the invention. Other embodiments having different structures and operations do not depart from the scope of the present invention.

A user may configure a parameter within the control system that controls the method 200. The parameter may have the form of for example, but not limiting of, a range, a limit, or the like. The parameter may set the allowable pH level of the at least one corrosive. If the level of corrosives is within the allowable parameter then the method 200 may revert to step 210; otherwise the method 200 may proceed to step 230.

Figure 2B:
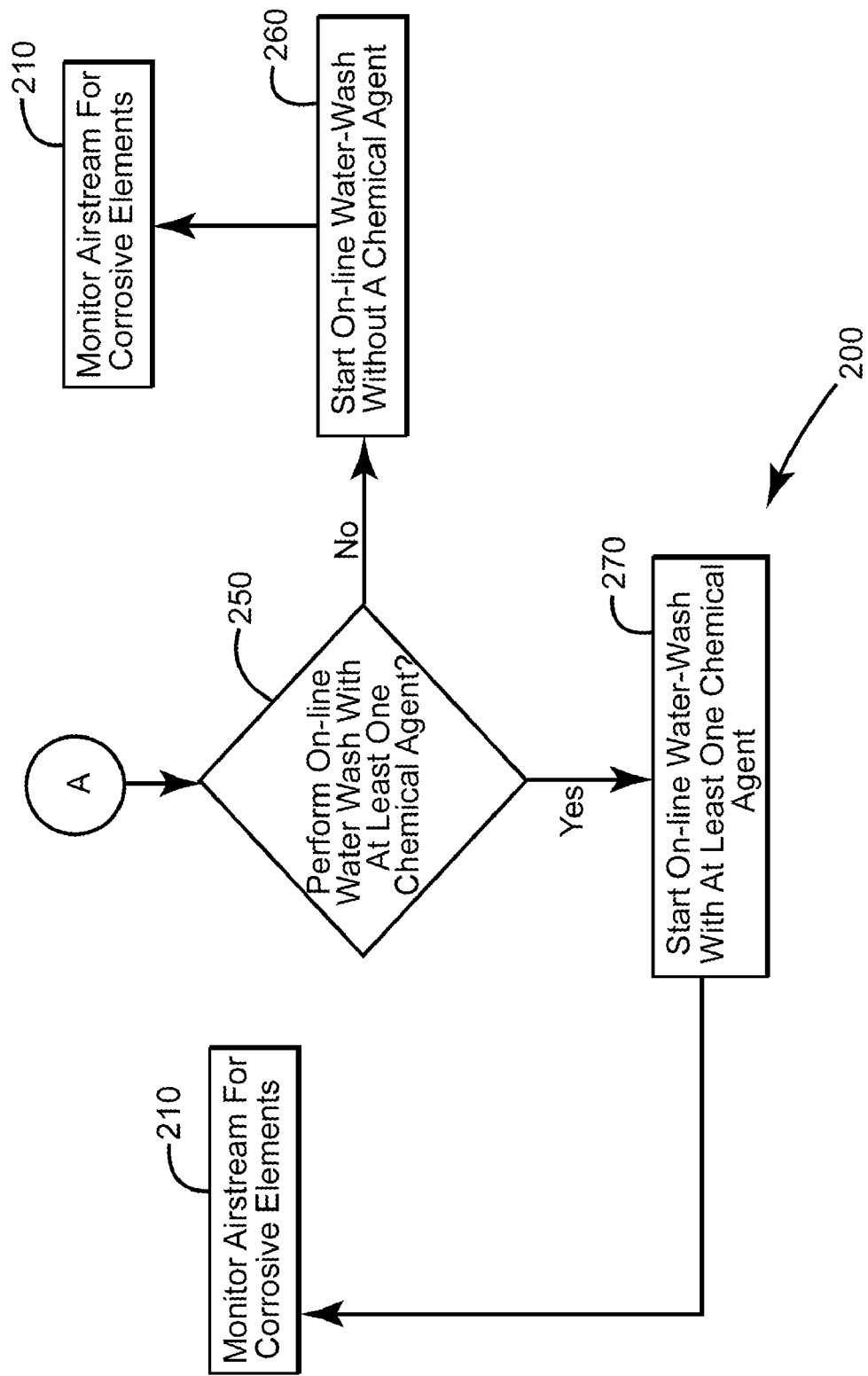

Referring now to FIGS. 2A and 2B, collectively FIG. 2, which are flowcharts illustrating a method 200 of initiating the on-line water wash system 165 to reduce the level of corrosives, in accordance with an embodiment of the present invention. The method 200 may include at least one control system, which may function, for example, but not limiting of, in steps 210 to 270. In an embodiment of the present invention the method 200 may be integrated with a graphical user interface (GUI), or the like. The GUI may allow the operator to navigate through the method 200 described below. The GUI may also provide at least one notification of the status of the method 200.

In step 210, the method 200 may monitor the airstream for corrosive elements. An embodiment of the present invention may use the corrosion detection system 170 to monitor the airstream. Generally, the corrosion detection system 170 receives a sample of the airstream being ingested by the compressor 155. The corrosion detection system 170 may comprise at least one air processing unit, or the like, which may separate at least one corrosive from the airstream sample. The corrosion detection system 170 may also comprise at least one analyzer for determining the pH of a corrosive element extracted from the sample of the airstream. For example, but not limiting of, the analyzer may be in the form of a particulate analyzer, PH monitor, a similar device, or combinations thereof.

A first embodiment of the corrosion detection system 170 may divert a sample of the airstream through a container such as, but not limiting of, a tank, a vessel, or a reservoir, which stores a fluid. The fluid may comprise de-min water, or any other fluid that allows for the at least one corrosive to dissolve. The fluid may become infused with the sample of the airstream, allowing the at least one corrosive to dissolve into the fluid. For example, but not limiting of, the airstream sample may be bubbled into the container, allowing for the infusion of the sample and the fluid.

Next, the first embodiment of the corrosion detection system 170 may use at least one analyzer to determine the pH of the mixture of the fluid and the at least one corrosive. The pH may give a reasonable indication of the level of corrosive(s) being ingested by the compressor 155. Next, the corrosion detection system 170 may replace the fluid mixed with the dissolved corrosive(s) with a fresh supply of fluid. Here, the fluid may be replaced at regular interval set by an operator. For example, but not limiting of, the fluid may be replaced every 30 minutes to maintain an accurate pH measurement.

A second embodiment of the corrosion detection system 170 may target airborne corrosives, which may be in a liquid form and/or a condensable vapor within the airstream. Generally, an operating compressor 155 causes a temperature depression and negative pressure of the ingested airstream. The operation of the compressor 155 may cause the condensable vapors and/or liquids to deposit on the components, such as, but not limiting of, the blades of the compressor 155. For example, but not limiting of, sulfur oxides or chloride may exist within the airstream entering the compressor 155. The condensation and temperature depression in the airstream, due to the operation of the compressor 155, may cause the condensate to fall onto the stages of the compressor 155. This action allows for the sulfur oxide, chloride, etc. to dissolve in the condensing water allowing for an acid to form and deposit onto the compressor 155 blades.

In this second embodiment of the corrosion detection system 170, at least one heat exchanger, such as, but not limiting of, a cooling coil may be installed in the inlet system 100. The at least one heat exchanger may receive and cool a sample of the airstream, allowing for the aforementioned vapors to condense. The sample may then be analyzed using at least one analyzer, of the corrosion detection system 170 to determine the pH of the condensate derived from the condensed vapors.

Referring again to FIG. 2, in step 220 the method 200 may determine whether a mitigating action is required. A mitigating action may be considered any action used to reduce the level of corrosive(s) on the compressor 155. For example, but not limiting of, a mitigating action may be operating the on-line water wash system 165.

In step 230, the method 200 may provide a notification of the need to start a mitigating action. The notification may be sent to the control system that operates the compressor 155. The notification may be in the form of an alarm, and/or other message indicating that the fouling of the compressor 155 may be occurring.

In step 240, the method 200 may prompt the operator to start the on-line water wash system 165. In an embodiment of the present invention the on-line water wash system 165 may automatically begin after a designated time period. In an alternate embodiment of the present invention, the method 200 may require that the operator manually start the on-line water wash system 165. This may allow the operator to confirm that the on-line water wash system 165 is ready for the operation. If the on-line water wash system 165 is to begin then the method 200 may proceed to step 250; otherwise the method 200 may revert to step 210.

Generally, if the operating environment of the turbomachine 200 is acidic in nature, then the deposits on the compressor 155 may be acidic in nature. These acidic corrosives may include for example, but not limiting of, sulfur oxides or a chloride. The inlet filter house 110 may not completely mitigate the effect of these acidic compounds on the compressor 155. An embodiment of the present invention may mix at least one chemical agent with a cleaning fluid, creating a cleaning solution that may reduce the level of corrosive deposits on the compressor 155. Here the clean solution may be considered mildly basic. The cleaning solution may react with the acidic deposits on the compressor 155, neutralizing, and possibly mitigating the corrosion.

In this embodiment, the pH range of the cleaning solution may be from about 7 to about 14. The at least one chemical agent may comprise at least of: sodium hydroxide; caustic soda; calcium hydroxide; ammonium hydroxide; ammonia water; magnesium hydroxide; a bleach; or combinations thereof.

Similarly, if the operating environment of the turbomachine 200 is caustic in nature, then the deposits on the compressor 155 may be caustic in nature. The inlet filter house 110 may not completely mitigate the effect of these caustic compounds on the compressor 155. An embodiment of the present invention may mix at least one chemical agent with a cleaning fluid, creating a cleaning solution for reducing the amount of corrosive deposits on the compressor 155. Here the cleaning solution may be considered mildly acidic. The cleaning solution may react with the basic deposits on the compressor 155, neutralizing, and possibly mitigating the corrosion.

In this embodiment, the pH range of the cleaning solution may be from about 1 to about 7. The at least one chemical agent may comprise at least of: hydrochloric acid; sulfuric acid; nitric acid; carbonic acid; uric acid; ascorbic acid; citric acid; acetic acid; tannic acid; tartaric acid; or combinations thereof.

Referring again to FIG. 2, in step 250, the method 200 may determine whether to perform the on-line water wash using at least one chemical agent. An embodiment of the water wash system 165 may comprises allows for at least one chemical agent to be mixed with a cleaning fluid to form a cleaning solution. The cleaning solution may provide a more effective means to reduce the corrosive deposits on the compressor 155, as described above. If the on-line water wash system 165 will use at least one agent then the method 200 may proceed to step 270; otherwise the method 200 may proceed to step 260.

In step 260, the method 200 may perform an on-line water wash. As described above, the on-line water wash system 165 may begin automatically after a designated time period. Alternatively, the method 200 may require that the operator manually start the on-line water wash system 165. After the on-line water wash cycle is completed, the method 200 may then revert to step 210.

In step 270, the method 200 may perform the on-line water wash using at least one chemical agent, as discussed. The on-line water wash system 165 may begin automatically after a designated time period. Alternatively, the method 200 may require that the operator manually start the on-line water wash system 165.

For example, but not limiting of, the on-line water wash system 165 in accordance with embodiments of the present invention may operate as follows. An operator may initiate the on-line water wash system 165. Then a rinse cycle commences; which may only use at least one cleaning fluid. Next, a wash cycle commences; which may include at least one cleaning solution comprising at least one cleaning fluid and at least one cleaning agent. Next, a second and/or final rinse may commence to rinse away some of the corrosives and the cleaning solution from the compressor 155. After the on-line water wash cycle is completed, the method 200 may then revert to step 210.

Figure 3:
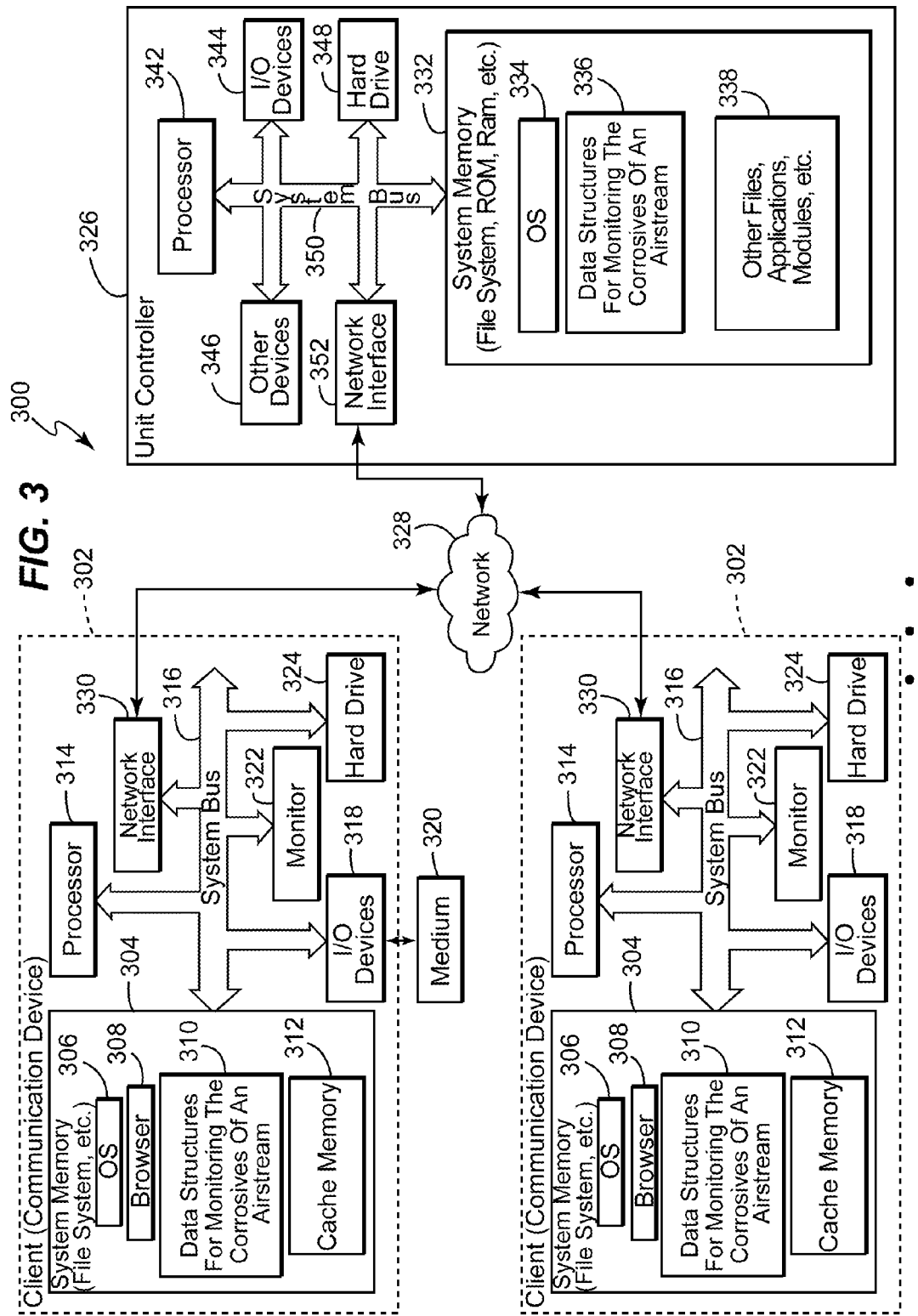
FIG. 3 is a block diagram of an exemplary system for monitoring the corrosives of an airstream in accordance with an embodiment of the present invention.

FIG. 3 is a block diagram of an exemplary system 300 for monitoring the corrosives of an airstream in accordance with an embodiment of the present. The elements of the method 200 may be embodied in and performed by the system 300.

The system 300 may include one or more user or client communication devices 302 or similar systems or devices (two are illustrated in FIG. 3). Each communication device 302 may be for example, but not limited to, a computer system, a personal digital assistant, a cellular phone, or similar device capable of sending and receiving an electronic message.

The communication device 302 may include a system memory 304 or local file system. The system memory 304 may include for example, but is not limited to, a read only memory (ROM), a random access memory (RAM), a flash memory, and other storage devices. The ROM may include a basic input/output system (BIOS). The BIOS may contain basic routines that help to transfer information between elements or components of the communication device 302. The system memory 304 may contain an operating system 306 to control overall operation of the communication device 302. The system memory 304 may also include a browser 308 or web browser. The system memory 304 may also include data structures 310 or computer-executable code for monitoring the corrosives of an airstream in accordance with an embodiment of the present invention that may be similar or include elements of the method 200 in FIG. 2.

The system memory 304 may further include a template cache memory 312, which may be used in conjunction with the method 200 in FIG. 2 for monitoring the corrosives of an airstream.

The communication device 302 may also include a processor or processing unit 314 to control operations of the other components of the communication device 302. The operating system 306, browser 308, and data structures 310 may be operable on the processing unit 314. The processing unit 314 may be coupled to the memory system 304 and other components of the communication device 302 by a system bus 316.

The communication device 302 may also include multiple input devices (I/O), output devices or combination input/output devices 318. Each input/output device 318 may be coupled to the system bus 316 by an input/output interface (not shown in FIG. 3). The input and output devices or combination I/O devices 318 permit a user to operate and interface with the communication device 302 and to control operation of the browser 308 and data structures 310 to access, operate and control the software for monitoring the corrosives of an airstream. The I/O devices 318 may include a keyboard and computer pointing device or the like to perform the operations discussed herein.

The I/O devices 318 may also include for example, but are not limited to, disk drives, optical, mechanical, magnetic, or infrared input/output devices, modems or the like. The I/O devices 318 may be used to access a storage medium 320. The medium 320 may contain, store, communicate, or transport computer-readable or computer-executable instructions or other information for use by or in connection with a system, such as the communication devices 302.

The communication device 302 may also include or be connected to other devices, such as a display or monitor 322. The monitor 322 may permit the user to interface with the communication device 302.

The communication device 302 may also include a hard drive 324. The hard drive 323 may be coupled to the system bus 316 by a hard drive interface (not shown in FIG. 3). The hard drive 324 may also form part of the local file system or system memory 304. Programs, software, and data may be transferred and exchanged between the system memory 304 and the hard drive 324 for operation of the communication device 302.

The communication device 302 may communicate with at least one unit controller 326 and may access other servers or other communication devices similar to communication device 302 via a network 328. The system bus 316 may be coupled to the network 328 by a network interface 330. The network interface 330 may be a modem, Ethernet card, router, gateway, or the like for coupling to the network 328. The coupling may be a wired or wireless connection. The network 328 may be the Internet, private network, an intranet, or the like.

The at least one unit controller 326 may also include a system memory 332 that may include a file system, ROM, RAM, and the like. The system memory 332 may include an operating system 334 similar to operating system 306 in communication devices 302. The system memory 332 may also include data structures 336 for monitoring the corrosives of an airstream. The data structures 336 may include operations similar to those described with respect to the method 200 respectively for monitoring the corrosives of an airstream. The server system memory 332 may also include other files 338, applications, modules, and the like.

The at least one unit controller 326 may also include a processor 342 or a processing unit to control operation of other devices in the at least one unit controller 326. The at least one unit controller 326 may also include I/O device 344. The I/O devices 344 may be similar to I/O devices 318 of communication devices 302. The at least one unit controller 326 may further include other devices 346, such as a monitor or the like to provide an interface along with the I/O devices 344 to the at least one unit controller 326. The at least one unit controller 326 may also include a hard disk drive 348. A system bus 350 may connect the different components of the at least one unit controller 326. A network interface 352 may couple the at least one unit controller 326 to the network 328 via the system bus 350.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A method of reducing a level of corrosion on a compressor, the method comprising:
   providing a corrosion detection system adapted to perform the steps of:
      separating at least one corrosive from a sample of an airstream entering the compressor; and
      determining a level of the at least one corrosive;
   determining whether a mitigating action is desired to reduce the level of the at least one corrosive; and
   reducing the level of the at least one corrosive, if the mitigating action is desired;
   wherein the corrosion detection system determines whether corrosive elements within the airstream are fouling the compressor.

2. The method of claim 1 further comprising:
   diverting the sample of the airstream through a container having a cleaning fluid, wherein the at least one corrosive dissolves into the fluid; and
   determining the level of corrosives by utilizing at least one analyzer to measure the pH of a mixed fluid, wherein the mixed fluid comprises the fluid and the at least one corrosive.

3. The method of claim 2 further comprising replacing the mixed fluid with the cleaning fluid.

4. The method of claim 1 further comprising condensing vapors of the at least one corrosive by utilizing at least one heat exchanging device of the corrosion detection system.

5. The method of claim 4, wherein the at least one analyzer determines the pH of a condensate derived from the vapors that have condensed.

6. The method of claim 1 further comprising:
   utilizing the corrosion detection system to monitor the airstream for at least one corrosive element;
   determining whether a mitigating action is required; and
   determining whether to perform an on-line water wash.

7. The method of claim 6 further comprising providing a notification that a mitigating action is required.

8. The method of claim 6, wherein the step of determining whether to perform the on-line water wash comprises determining whether to add at least one chemical agent to the on-line water wash.

9. A system for reducing a level of corrosion on a compressor, the system comprising:
   a turbomachine comprising:
      an inlet system;
      a compressor;
      a turbine section;
   an on-line water wash system;
   a corrosion detection system comprising:
      a processing unit configured to separate a corrosive from a sample of an airstream entering the compressor; and
      an analyzer configured to determine a level of the at least one corrosive; and a control system comprising at least one processor, wherein the control system performs the steps of:
utilizing the corrosion detection system to monitor the airstream for the corrosive;
determining whether a mitigating action is desired to reduce the level of the corrosive;
determining whether to perform a water wash; and
controlling the on-line water wash system if the water wash is desired;
wherein the corrosion detection system determines whether corrosive elements within the airstream are fouling the compressor.

10. The system of claim 9, wherein the on-line water wash system utilizes a cleaning solution, wherein the cleaning solution is created by mixing a chemical agent with a cleaning fluid, and wherein the on-line water wash system delivers the cleaning fluid to the compressor.

11. The system of claim 10, wherein the cleaning solution is basic to allow for neutralizing acidic corrosives.

12. The system of claim 10, wherein the cleaning solution is acidic to allow for neutralizing caustic corrosives.

13. The system of claim 12, wherein the chemical agent comprises at least of: hydrochloric acid; sulfuric acid; nitric acid; carbonic acid; uric acid; ascorbic acid; citric acid; acetic acid; tannic acid; tartaric acid; or combinations thereof.

14. The system of claim 11, wherein the chemical agent comprises at least of: sodium hydroxide; caustic soda; calcium hydroxide; ammonium hydroxide; ammonia water; magnesium hydroxide; a bleach; or combinations thereof.

15. The system of claim 10, wherein the cleaning fluid comprises de-min water.

16. The system of claim 9, wherein the corrosion detection system performs the steps of:
diverting the sample of the airstream through a container having a cleaning fluid, wherein the at least one corrosive dissolves into the fluid; and
utilizing the analyzer to measure the pH of a mixed fluid; wherein the mixed fluid comprises the fluid and the dissolved at least one corrosive.

17. The system of claim 16, wherein the on-line water wash system is configured to replace the mixed fluid with the cleaning fluid.

18. The system of claim 9, wherein the corrosion detection system comprises a heat-exchanging device; wherein the heat-exchanging device cools the sample of the airstream causing vapors of the corrosive to condense.

19. The system of claim 18, wherein the analyzer determines the pH of a condensate derived from the vapors that have condensed.

20. A method of reducing a level of corrosion on a compressor, the method comprising:
providing a corrosion detection system adapted to perform the steps of:
separating at least one corrosive from a sample of an airstream entering the compressor;
determining a level of the at least one corrosive;
diverting the sample of the airstream through a container having a cleaning fluid, wherein the at least one corrosive dissolves into the fluid;
determining the level of corrosives by utilizing at least one analyzer to measure the pH of a mixed fluid, wherein the mixed fluid comprises the fluid and the at least one corrosive;
replacing the mixed fluid with the cleaning fluid;
condensing vapors of the at least one corrosive by utilizing at least one heat exchanging device of the corrosion detection system; and
operating the at least one analyzer to determine the pH of a condensate derived from the vapors that have condensed;
determining whether a mitigating action is desired to reduce the level of the at least one corrosive; and
reducing the level of the at least one corrosive, if the mitigating action is desired;
wherein the corrosion detection system determines whether corrosive elements within the airstream are fouling the compressor.

21. The method of claim 20 further comprising:
utilizing the corrosion detection system to monitor the airstream for at least one corrosive element; and
determining whether to perform an on-line water wash.

22. The method of claim 21 further comprising the step of providing a notification that a mitigating action is required.

23. The method of claim 21, wherein the step of determining whether to perform the on-line water wash comprises determining whether to add at least one chemical agent to the on-line water wash.

24. A system for reducing fouling on a compressor, the system comprising:
an air ingesting turbomachine comprising:
an inlet system;
a compressor;
a turbine section;
an on-line water wash system;
a corrosion detection system comprising:
a processing unit configured to separate a corrosive from a sample of an airstream entering the compressor; and
an analyzer configured to determine a level of the at least one corrosive;
wherein the corrosion detection system determines whether corrosive elements within the airstream are fouling the compressor;
a control system comprising at least one processor, wherein the control system performs the steps of:
utilizing the corrosion detection system to monitor the airstream for the corrosive;
separating at least one corrosive from a sample of an airstream entering the compressor;
determining a level of the at least one corrosive;
diverting the sample of the airstream through a container having a cleaning fluid, wherein the at least one corrosive dissolves into the fluid;
utilizing at least one analyzer to measure the pH of a mixed fluid, wherein the mixed fluid comprises the fluid and the at least one corrosive;
replacing the mixed fluid with the cleaning fluid;
condensing vapors of the at least one corrosive by utilizing at least one heat exchanging device of the corrosion detection system; and
operating the at least one analyzer to determine the pH of a condensate derived from the vapors that have condensed;
determining whether a mitigating action is desired to reduce the level of the corrosive;
determining whether to perform a water wash; and
controlling the on-line water wash system to reduce the level of the at least one corrosive if the water wash is required.

25. The system of claim 24 further comprising: wherein the on-line water wash system utilizes a cleaning solution that is created by mixing a chemical agent with the cleaning fluid, and wherein the on-line water wash system delivers the cleaning solution to the compressor.

26. The system of claim 24, wherein the control system performs the step of providing a notification that a mitigating action is required.

27. The system of claim 25, wherein control system performs the step of determining whether to add at least one chemical agent to the on-line water wash.

28. The system of claim 24, wherein the on-line water wash system is configured to replace the mixed fluid with the cleaning fluid when operatively required.

29. The system of claim 24, wherein the corrosion detection system comprises a heat-exchanging device; wherein the heat-exchanging device cools the sample of the airstream causing vapors of the corrosive to condense.

* * * * *